United States Patent
Erdmann et al.

(10) Patent No.: US 10,364,714 B2
(45) Date of Patent: Jul. 30, 2019

(54) DEVICE FOR THE SEPARATION OF OIL DROPLETS AND/OR OIL MIST

(71) Applicant: REINZ-DICHTUNGS-GMBH, Neu-Ulm (DE)

(72) Inventors: Christoph Erdmann, Ulm (DE); Yagiz Yaman, Neu-Ulm (DE); Francesco Zitarosa, Illertissen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 162 days.

(21) Appl. No.: 15/329,302

(22) PCT Filed: Jul. 29, 2015

(86) PCT No.: PCT/EP2015/067359
§ 371 (c)(1),
(2) Date: Jan. 26, 2017

(87) PCT Pub. No.: WO2016/016294
PCT Pub. Date: Feb. 4, 2016

(65) Prior Publication Data
US 2017/0204755 A1    Jul. 20, 2017

(30) Foreign Application Priority Data
Jul. 29, 2014  (DE) .................. 20 2014 006 149 U

(51) Int. Cl.
*F01M 13/04* (2006.01)
*F01M 13/00* (2006.01)
(Continued)

(52) U.S. Cl.
CPC ............ *F01M 13/04* (2013.01); *B01D 45/06* (2013.01); *B01D 45/08* (2013.01); *B01D 45/16* (2013.01);
(Continued)

(58) Field of Classification Search
CPC ........ F01M 13/04; F01M 13/00; B01D 45/06; B01D 45/08; B01D 45/16
See application file for complete search history.

(56) References Cited

U.S. PATENT DOCUMENTS

| 2,187,265 A * | 1/1940 | Carlson .............. F01M 13/0011 |
|---|---|---|
| | | 55/417 |
| 6,883,505 B1 | 4/2005 | Francis |

(Continued)

FOREIGN PATENT DOCUMENTS

| CN | 1925902 A | 3/2007 |
|---|---|---|
| DE | 102005048952 A1 | 4/2007 |

(Continued)

OTHER PUBLICATIONS

International Search Report and Written Opinion for Application No. PCT/EP2015/067359, dated Oct. 13, 2015, issued by the European Patent Office.
(Continued)

*Primary Examiner* — Kevin A Lathers
(74) *Attorney, Agent, or Firm* — Marshall & Melhorn, LLC

(57) ABSTRACT

A device for the separation of oil droplets and/or oil mist from blow-by gases of an internal combustion engine with a valve for the control of the gas stream through the air-oil separator. The valve has a valve body with at least two or several gas passage openings as well as a valve closure for the closure of gas passage openings of the valve body.

23 Claims, 9 Drawing Sheets

(51) Int. Cl.
*F16K 15/16* (2006.01)
*B01D 45/08* (2006.01)
*B01D 45/16* (2006.01)
*B01D 45/06* (2006.01)

(52) U.S. Cl.
CPC ............. *F01M 13/00* (2013.01); *F16K 15/16* (2013.01); *F01M 2013/0044* (2013.01); *F01M 2013/0433* (2013.01)

(56) References Cited

U.S. PATENT DOCUMENTS

| | | |
|---|---|---|
| 2004/0261776 A1 | 12/2004 | Knaus et al. |
| 2007/0272176 A1* | 11/2007 | Wagner .................. B01D 45/16 123/41.86 |
| 2007/0281205 A1 | 12/2007 | Wagner et al. |
| 2009/0301449 A1* | 12/2009 | Ogawa .................. F01M 13/022 123/574 |
| 2010/0050962 A1 | 3/2010 | Hoffmann et al. |
| 2010/0307466 A1 | 12/2010 | Ruppel et al. |
| 2011/0036242 A1 | 2/2011 | Enderich et al. |
| 2016/0312672 A1* | 10/2016 | Takai .................. F01M 13/0416 |

FOREIGN PATENT DOCUMENTS

| | | |
|---|---|---|
| DE | 102007012483 A1 | 9/2008 |
| DE | 202007017507 U1 | 4/2009 |
| DE | 102009035742 A1 | 2/2011 |
| DE | 102012216531 A1 | 3/2014 |
| EP | 2700791 A1 | 2/2014 |
| JP | H0763036 A | 3/1995 |
| WO | 2015150271 A1 | 10/2015 |
| WO | 2015158819 A1 | 10/2015 |

OTHER PUBLICATIONS

International Preliminary Report on Patentability for Application No. PCT/EP2015/067359, dated Feb. 9, 2017, issued by the European Patent Office.

China National Intellectual Property Administration, Office Action in Application No. 201580050662.2, dated Jan. 28, 2019, 13 pages.

* cited by examiner

DEVICE FOR THE SEPARATION OF OIL DROPLETS AND/OR OIL MIST

BACKGROUND OF THE INVENTION

The present invention relates to a device for the separation of oil droplets and/or oil mist from blow-by gases of an internal combustion engine with a valve for the control of the gas stream through the air-oil separator, where the valve comprises a valve body with at least two or several gas passage openings as well as a valve closure for the closure of gas passage openings of the valve body.

Nowadays, a large amount of air-oil separation geometries are realized in an adaptive way. Some of these variants use moveable spring-steel segments, which are arranged behind the air-oil separation geometry. The spring-steel segments open further channels of the air-oil separator geometry upon excess of a pre-set pressure difference, in order to prevent a blocking of the air-oil separator. At the same time, it has to be ascertained that even with a small pressure difference a gas stream through the air-oil separator is maintained.

SUMMARY OF THE INVENTION

Based on this state of the art, it is therefore the object of the present invention to provide for a device for the separation of oil from blow-by gases, which improves the efficiency of the air-oil separator even with varying pressure differences and which can be produced in a simple, fast, cost-efficient and scalable manner.

A device for the separation of oil droplets and/or oil mist from blow-by gas according to the invention, which blow-by gas in the following is also referred to as gas or gas-oil mixture, of a combustion engine comprises a valve for the control of a gas stream from a pressure side to a suction side of the air-oil separator. The valve here comprises a valve body with at least two or several gas passage openings from the pressure side to the suction side of the valve. The valve further comprises at least one valve closure, in particular a valve disk, for the suction-sided closure(s) of gas passage openings of the valve body. The valve closure further comprises at least one resilient tongue, which resilient tongue(s) is/are realized in such a way that at least one of the gas passage openings cannot be closed by this resilient tongue or anyone of the resilient tongues.

The present invention improves the air-oil separation efficiency both with small pressure differences between the suction and the pressure side of the air-oil separator, where the resilient tongue(s) closes gas passage openings, as at least one of the gas passage openings cannot be closed or is not closed by the resilient tongue(s) so that a gas stream at least through this gas passage opening which cannot be closed is guaranteed.

In an advantageous embodiment of the invention, the resilient tongue(s) in flow-direction of the gas stream behind at least one of the gas passage openings comprise(s) a passage opening in an axial-concentric or axial-eccentric manner, so that this gas passage opening cannot be or is not closed by the resilient tongue. Such a passage opening enables a gas stream from a gas passage opening arranged in front of the passage opening even with a small pressure difference between the suction and the pressure side.

It is preferred if the diameter of at least one of the passage openings is smaller than the diameter of the suction-sided outlet of the gas passage opening arranged axially in front of the passage opening. This way, an air-oil separation takes place especially along the edge of the passage opening during the passage of the passage opening. Given the dynamic effects, this further improves the separation efficiency.

The device can also be realized in such a way that the resilient tongue(s) does/do not extend over at least one of the gas passage openings. Thus, in this case, at least one of the gas passage openings cannot be closed by the resilient tongue(s) independent of the design of the resilient tongue.

In the device according to the invention, it is possible that two or several resilient tongues are provided. In case of two or more resilient tongues, they can comprise a common mounting area for the mounting of the resilient tongue at a valve body. With a common mounting area, the mounting area can be designed smaller, one can save material and one can provide space for essential parts of the valve on the valve body and/or one can design the valve smaller.

In an advantageous embodiment of the invention, at least one of the resilient tongues is connected through a fastening arm at the valve body in a resilient way in such a manner that it is freely moveable between a first position in which it closes the gas passage openings that are covered by it and between a second position in which it releases the gas passage openings that are covered by it. This way, the pressure difference can be continuously adapted between the suction and the pressure side of the valve.

At least one of the fastening arms can be connected in such a way that the resilient tongue fastened through this fastening arm is moveable via this fastening arm, so that it successively moves away from the at least two gas passage openings or that it successively closes them, respectively. This way, a pressure difference between the suction and the pressure side of the valve can be set more accurately. This makes it possible for the invention to use the air-oil separator dependent on the volume flow at a particular point of operation with an optimized number of passage openings.

At least one of the fastening arms can also be mounted in such a way that at least one of the resilient tongues moves away from at least two gas passage openings or approaches them, respectively, in a tilting movement. This also allows to adapt a predetermined pressure difference between a suction and a pressure side of the valve more precisely.

At least one of the resilient tongues can also be mounted with a pre-tension in such a way that it closes the gas passage openings that it closes when the pressure difference between the side of the resilient tongue facing the gas passage openings and the side of the resilient tongue pointing away from the gas passage openings is below a predetermined threshold value.

The device according to the invention may further be designed in such a way that the valve body comprises at least two groups of gas passage openings, which groups each comprise at least two gas passage openings. In this case, the valve closure can comprise a number of resilient tongues which corresponds to the number of gas passage openings, with each of the resilient tongues being arranged in such a way, that gas passage openings of a group can each at least in part be closed by one of the resilient tongues.

A further advantageous design of the invention provides that for each of the resilient tongues, two fastening arms are provided, which extend along two opposite edges of the resilient tongue and enclose one of the resilient tongues in the plane of the resilient tongue between them, with the fastening arms at one of their ends being mounted at the valve body and at the other end with the resilient tongue, in cases as one piece with the resilient tongue. With this mounting, the resilient tongue can move away from the gas passage openings in a parallel manner upon a sufficiently high gas pressure in the gas passage openings covered by the resilient tongue and this way open all covered gas passage openings simultaneously and to the same degree. In other words, when opening the gas passage openings, the distance between the resilient tongue and the gas passage openings along the resilient tongue remains essentially constant. If the resilient tongue moves away in this parallel manner from the gas passage openings covered by it, this results in two bending areas or three bending areas. One bending area is situated in the area where the fastening arms are connected to the valve body, thus each one bending area per fastening arm. The second bending area is located at the one-piece connection between the fastening arms and the resilient tongue, thus where the fastening arms continue in the resilient tongue. The bending areas extend essentially parallel to each other and in cases parallel to a line, which connects the fastening areas of the fastening arms at the valve body to each other.

Preferably, the fastening arms, when viewed in radial direction, thus away from the mounting points of the fastening arms at the valve body, are connected to the resilient tongue, in cases as one piece, behind the last gas passage opening which can be closed by the respective resilient tongue With an increasing distance of the fastening arms to the mounting areas at the valve body, the fastening arms preferably comprise an increasing pretension. This way, the gas pressure required for the opening of the resilient tongue remains constant even with an increasing distance to the mounting areas.

In a further embodiment of the invention, at least two of the gas passage openings, in particular two passage openings covered by different resilient tongues, can have different cross-sections of their inlets and/or their outlets and/or centrally between their inlets and their outlets, in particular relative to the cross-sectional area and/or the cross-sectional shape.

Further, at least two adjacent gas passage openings can be connected to each other along their axial extension at least in sections, in particular in the area of their outlets.

It is further advantageous if the gas passage openings in one radial direction, thus orthogonal to their axial extension, are each delimited by a wall. The wall here can be one-piece or combined from several pieces. It is further advantageous if at least one of the gas passage openings along its axial extension at least in sections comprises a slit in the wall, where the slit does not open to another gas passage opening. Through such a slit, e.g. in a peripheral gas passage opening, one can guide the gas flow streaming through the gas passage opening via an alternative way out of the valve and this way oil carried in the gas can be separated at the wall of the gas passage opening, at the surface of the resilient tongue or in the area of the slit.

In a further embodiment of the invention, the valve body can comprise at least one base plate, in which the gas passage openings are located, with the wall of at least one of the gas passage opening protruding in the direction of the resilient tongue over the base plate. The valve body may also consist in several base plates arranged one behind the other, in particular two or three base plates.

It is preferred if at least one of the resilient tongues on at least one, several or each of its edges, comprises lateral walls bent in the direction of the gas passage openings surrounding the gas passage openings laterally in sections, which lateral walls form a collar.

It is further possible to provide a protrusion surrounding the circumferential edge of the passage opening in at least one of the resilient tongues at at least one of the passage openings, which protrusion projects from the plane of the resilient tongue pointing away from the gas passage openings. On its side pointing away from the plane of the resilient tongue, the protrusion at its free end can be designed wave-shaped, so that the protrusion circumferentially shows a varying height. At wave crests and/or wave troughs of the free end of the protrusion, oil that is carried along can also be separated from the gas flowing through the passage openings.

Further, in at least one of the resilient tongues at at least one of the passage openings, a protrusion surrounding the outer edge of the passage opening in sections can be arranged, which protrusion projects from the plane of the resilient tongue facing away from the gas passage openings, with the sectionally surrounding protrusion on its side pointing away from the resilient tongue projecting into a flow area with an angle of up to 50° relative to a longitudinal axis of the gas passage opening arranged ahead of it with respect to the flow direction, which longitudinal axis corresponds to an axial prolongation of at least one of the gas passage openings. At this protruding area projecting into the flow area, oil that is carried along, can be separated, too.

Moreover, in at least one of the gas passage openings, a gas-guiding geometry, which may for instance be helical, can be arranged, which causes that the gases passing it, rotate around the axial direction of the gas passage opening. If the valve body comprises several base plates, it is on the one hand possible that only one of the base plates comprises gas-guiding geometries. However, it is on the other hand also possible that the gas passage openings in two base plates which the gas passes consecutively, comprise gas-guiding geometries; These gas-guiding geometries may show identical sense of rotation, but it is preferred that they show inverse sense of rotation.

The resilient tongues show a ratio of the length of the resilient tongue to the width of the resilient tongue (length/width) in the range of 50/200 to 200/50, preferably of 75/150 or of 150/75. Here, the width of the resilient tongue is defined as the extension of the resilient tongue essentially orthogonal to the extension direction of the fastening arms and the length of the resilient tongue as the extension of the resilient tongue essentially parallel to the extension direction of the fastening arms.

At least one of the resilient tongues advantageously consists in a spring steel or comprises such. The metal thickness here preferably amounts to 0.08 to 0.15 mm, in each case inclusive the limits. As an alternative, the resilient tongues can also consist in polymeric materials or comprise such. Here, one can in particular make use of polyamides (PA), polyphthalamides (PPA), polyimides (PI), polyetherimides (PEI), polyphenylene-ethers (PPE), liquid crystal polymers (LCP), polyphenylene-sulfides (PPS), polyetheretherketones (PEEK), polysulphones (PSU) and/or polytetrafluorethylene (PTFE). The thickness of the resilient tongues in this case amounts to between 0.2 and 0.4 mm, preferably between 0.2 to 0.3 mm, again inclusive of the limits.

The valve body may preferably be produced from a thermoplastic plastic, in particular consist in a polyamide or polyamide 6.6 or comprise such.

The present invention thus represents a switchable air-oil geometry (AOS geometry) that is arranged behind the valve body with respect to the flow direction. The invention further allows to realize a scalability of adaptive air-oil separation system in a cost-efficient, fast and universal manner. This way, standardized AOS geometries can be used, where the scalability is not only determined by the number of air-oil separation channels, but also by the number of passages in the subsequent switching geometry. This allows to achieve an extreme flexibility until the beginning of production as well as cost savings since it allows for a strategy with identical parts.

The present invention further allows to do without additional one-way valves for the crankcase ventilation, as the at least one resilient tongue also functions as a one-way valve or—as far as it comprises passage openings or in the non deflected state does not cover all gas passage openings—as a throttle. With a complete closure, a blocking of the backward flow results. If one or several gas passage openings do however remain open, then a moderate aeration of the crankcase is realized.

BRIEF DESCRIPTION OF THE DRAWINGS

In the following, some examples of a device according to the invention are described using drawings. Here, various elements relevant or advantageous for the invention are mentioned in the frame of these examples, where individual of these elements as such can be used for an enhancement of the invention, also separate from the context of the examples. Further, identical or similar elements shown in the drawings are referred to with identical or similar reference numbers, respectively.

It is shown in

DETAILED DESCRIPTION OF THE INVENTION

Figure 1:
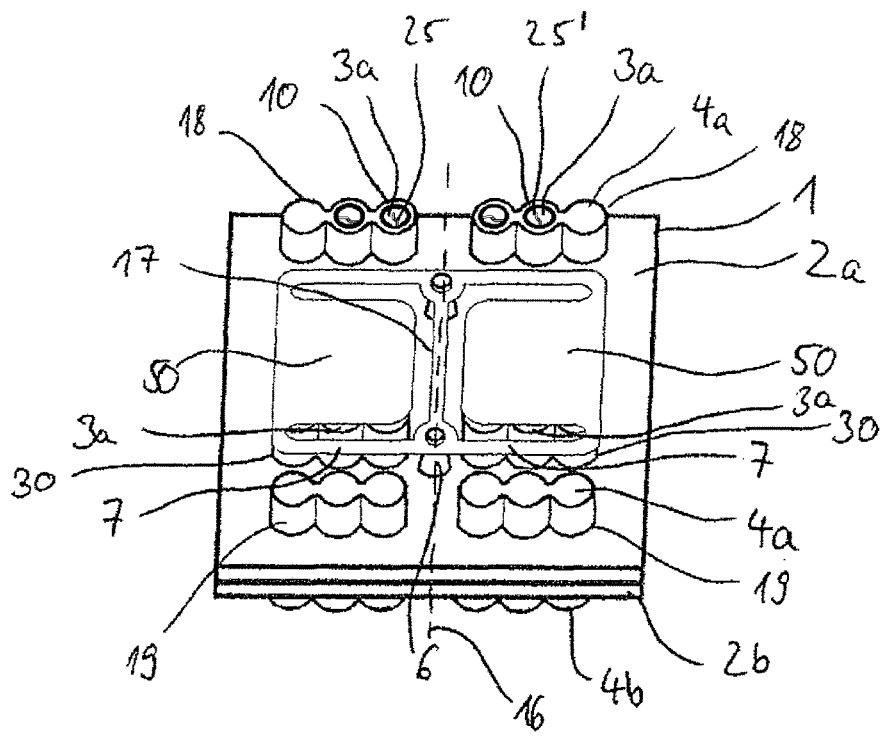
FIGS. 1 and 2 a first embodiment of a valve of a device according to the invention in a perspective top-view.

In the drawings, the following reference numbers are used:

| reference number | element |
| --- | --- |
| 1 | valve body |
| 2a, b, c | base plate |
| 3a, b, c | gas passage openings |
| 4a, b | closed channels |

-continued

| reference number | element |
| --- | --- |
| 5, 50 to 58 | resilient tongue |
| 6 | connecting means |
| 7, 7' | fastening arms |
| 8 | first bending area |
| 9 | second bending area |
| 10 | wall |
| 11 | passage openings |
| 12 | collar |
| 13 | box-like opening |
| 14 | slit |
| 15 | protrusion |
| 16 | central axis |
| 17 | bridge |
| 18 | group of gas passage openings and/or closed channels |
| 19 | group of closed channels |
| 20 | cylinder head cover |
| 21 | inlet |
| 22 | flow channel |
| 23 | impaction wall |
| 24 | first guiding geometry |
| 25 | second guiding geometry |
| 26 | collecting pan |
| 27 | oil outlet |
| 30 | group of gas passage openings |
| 31 | outward slit |
| 40 | 3-sided collar |
| 41 | slit |
| 42 | lateral wall |

FIG. 1 shows a first embodiment of a valve of a device according to the invention in a perspective view. The valve comprises a valve body 1, which comprises two rectangular base plates 2a, 2b, which are arranged one behind the other. The base plate 2b is arranged downstream with respect to the flow direction of the gas flowing through the valve. In the base plates 2a, 2b, both gas passage openings 3a, 3b on the one hand as well as closed channels 4a, 4b on the other hand are arranged flush one behind the other, so that the flowing gas can pass e.g. from one gas passage opening 3b into a gas passage opening 3a. With other words, the gas passage openings 3a, 3b and the closed channels 4a, 4b are arranged mirror-symmetric relative to each other with respect to their base areas.

The gas passage openings 3a comprise walls 10 shaped like walls of a cylinder, which protrude from the plane of the base plate 2a in the downstream direction. In the same way, the gas passage openings 3b comprise walls shaped like walls of a cylinder, which protrude from the plane of the base plate in the upstream direction. Further, second guiding geometries 24, 24' are arranged in the gas passage openings 3a and first guiding geometries 25, 25' are arranged in the gas passage openings 3b for the redirection of the gas are located, each with the shape of half a pit of a screw. In the gas passage openings 3a, 3b arranged one adjacent to each other or behind the other, geometries deflecting the gas in opposite directions are arranged in order to improve the separation efficiency using the strong change of direction of the gas stream. The closed channels 4a, 4b show the same outer shape as the gas passage openings 3a, 3b, but they are closed in such a way that no gas can pass through them. In order to adapt the valve to a particular engine, the closed channels 4a, 4b can be redesigned to gas passage openings 3a, 3b with simple changes of the tool. In the same way, the gas passage openings 3a, 3b can be redesigned into closed channels 4a, 4b in order to adapt the valve to a particular engine.

In the following, the exact arrangement of the gas passage openings 3a, 3b and of the closed channels 4a, 4b is only described for the base plate 2a; it is analogous for base plate 2b. The gas passage openings 3a and the closed channels 4a are arranged in groups. In the embodiment of FIG. 1, the gas passage openings 3a and the closed channels 4a are arranged on the base plate 2a symmetric to a central axis 16 of the base plate 2a, with the central axis being oriented parallel to the lateral edges of the base plate 2a. The central axis 16 divides the base plate 2a into two halves. Centered on one of the halves of the base plate 2a, a group 30 of twelve gas passage openings 3a is located, which is arranged in a rectangular pattern, with four gas passage openings 3a each being arranged next to each other and parallel to the central axis 16 and the three gas passage openings 3a being arranged next to each other and orthogonal to the central axis 16. Further, on both sides of the group 30 and approximately centered between one side the pattern, the central axis 16 and two adjacent lateral edges of the base plate 2a, two further groups 18 and 19 are located. Here, the group 18 comprises two gas passage openings 3a as well as one closed channel 4a, which are arranged one next to another orthogonal to the central axis 16 and where the gas passage openings 3a are neighboring the central axis 16. The group 19 comprises only three closed channels 4a, which are arranged one next to the other orthogonal to the central axis 16. The gas passage openings 3a and the closed channels 4a of the three groups of one half of the base plate 2a described before here are arranged in such a way, that their walls 10 touch each other. The arrangement of the gas passage openings 3a and of the closed channels 4a is designed symmetric with respect to the central axis 16 of the base plate 2a.

The groups 30 of gas passage openings 3a on both halves of the base plate 2a can each be opened and closed by a resilient tongue 50 located behind the group 30. The resilient tongues 50 comprise an essentially rectangular shape, so that all gas passage openings 3a of the groups 30 can be completely closed by the resilient tongues 50. All resilient tongues in their corners pointing away from the central axis are connected as one piece with fastening arms 7. In the closed state, the resilient tongues 50 rest to the walls 10 of the gas passage openings 3a approximately parallel to the plane of the base plate 2a. The fastening arms 7 here extend approximately parallel to the interspaces between the groups 30 and 18 and the groups 30 and 19 as well as orthogonal to the central axis 16. Each two fastening arms 7 extending on one side of the resilient tongues 50 are connected to each other as one piece via a bridge 17, which extends parallel to and in flow direction behind the central axis. Further, one mounting means is arranged at the crossing points between the fastening arms 7 and the bridge 17, at which one fastening arm 7 is mounted.

FIG. 1 shows the resilient tongues 50 in a closed state. The resilient tongues 50 open upon a sufficiently large pressure difference between the area facing the base plate 2b and the area facing the base plate 2a. In FIG. 1, a pressure difference can still be equilibrated by the gas passage openings 3a of the group 18, which are not covered by the resilient tongues 50. Therefore the pressure force of the gas flow is not sufficient in order to open the resilient tongues 50.

Figure 2:
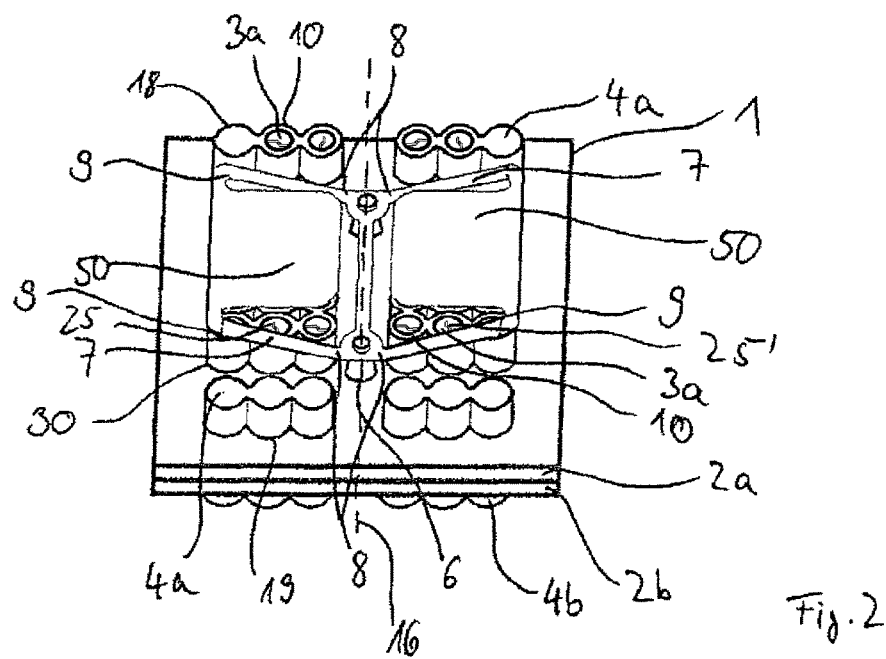

FIG. 2 shows the resilient tongues 50 in an opened state. In FIG. 2, the gas pressure is that high that a pressure difference between the area on the side of the base plate 2b and on the area on the side of the base plate 2a can no longer be equilibrated by the bypass openings 3a of the group 18 which are not covered by the resilient tongues 50. Therefore, the resilient tongues 50 open, so that the gas stream can also leave through the gas passage openings 3a of the group 30. Doing so, the resilient tongues 50 are pushed away from the base plate parallel to the latter because of the gas flow passing through the gas passage openings 3a of the group 30, so that bending areas 8 in the fastening arms 7 result parallel and adjacent to the central axis 16 and bending arms 9 result on a side distanced to the central axis 16 at the end of the fastening arms 7.

Figure 3:
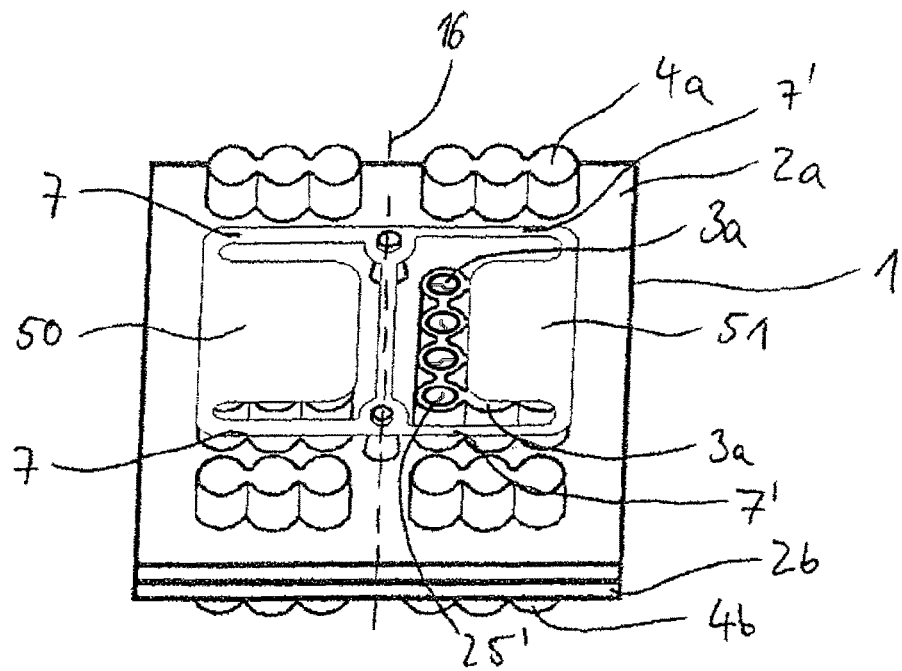
FIGS. 3 to 5 a second embodiment of a valve of a device according to the invention in a perspective top-view.

FIG. 3 illustrates a second embodiment of a valve of a device according to the invention in a perspective view. In FIG. 3, the groups 18 and 19 only comprise closed channels 4a. Only the groups 30 comprise gas passage openings 3a. In one of the halves of the base plate 2a, all gas passage openings 3a of the group 30 are covered by a resilient tongue designed as in FIGS. 1 and 2. In the second half of the base plate 2a, the resilient tongue 51 is realized smaller compared to FIGS. 1 and 2, so that now the four gas passage openings 3a closest to the central axis 16 are realized as bypass openings not covered by the resilient tongue 51. In addition, the fastening arms 7' of the resilient tongue 51 are realized smaller than the fastening arms 7 of the resilient tongue 50. In FIG. 3, the resilient tongues 50 and 51 are closed.

Figure 4:
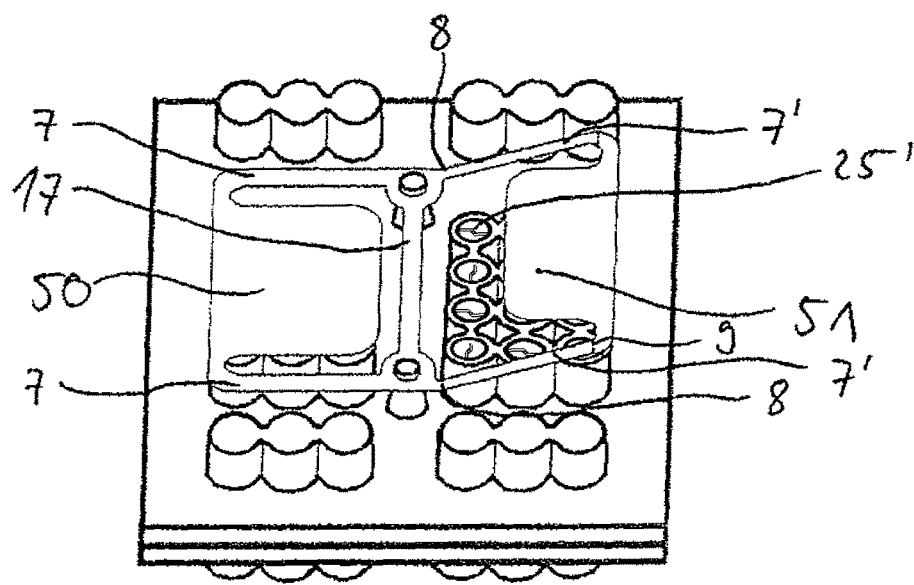

FIG. 4 shows the resilient tongue 51 in an open state and the resilient tongue 50 in a closed state. Further, the fastening arms 7', which are connected as one piece with the resilient tongue 51 are realized smaller than the fastening arms 7, which are connected as one piece with the resilient tongue 50. This way, one achieves that the resilient tongue 51 upon a pressure difference between the area on the side of the base plate 2b and the area on the side of the base plate 2a opens earlier than the resilient tongue 50. In the open state of the resilient tongue 51, bending areas 8 result in the area where the fastening arms 7' are connected as one piece with the resilient tongue 51, too, as well as bending areas 9 in the areas of the resilient tongue 51, where the resilient tongue 51 is connected as one piece with the fastening arms 7.

Figure 5:
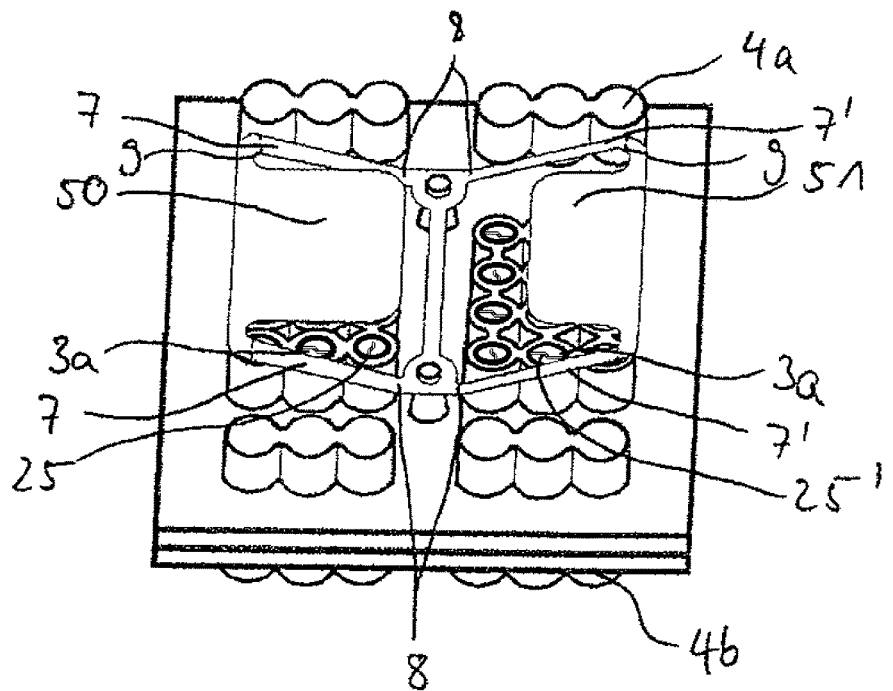

FIG. 5 shows both the resilient tongue and the resilient tongue 51 in the open state. The pressure difference between an area on the side of the base plate 2b and an area on the base plate 2a in FIG. 5 is sufficiently large so that both resilient tongues 50 and 51 are opened in order to equilibrate the pressure difference.

Figure 6:
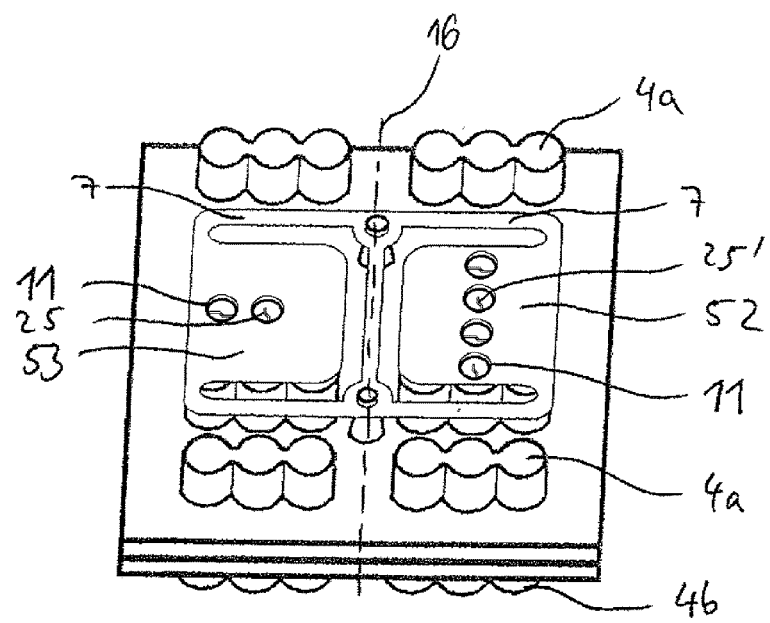
FIGS. 6 to 8 a third embodiment of a valve of a device according to the invention in a perspective top-view.

FIG. 6 shows a third embodiment of a valve of a device according to the invention in a perspective view. Compared to FIG. 1, the resilient tongues 52 and 53 in both halves of the base plate 2a comprise passage openings 11, which together with the gas passage openings 3a arranged in the flow direction of the gas ahead of the passage openings 11 form bypass openings. All of the gas passage openings of the groups 18 and 19, which are not covered by the resilient tongues 52 and 53 are realized as closed channels 4a. In the resilient tongue 53, two passage openings 11 are arranged next to each other and orthogonal to the central axis 16 in an area 16 of the resilient tongue 53 pointing away from the central axis. 16. In the resilient tongue 52, four passage openings 11 are formed, which are located centered in the resilient tongue next to each other in a direction parallel to the central axis 16.

Figure 7:
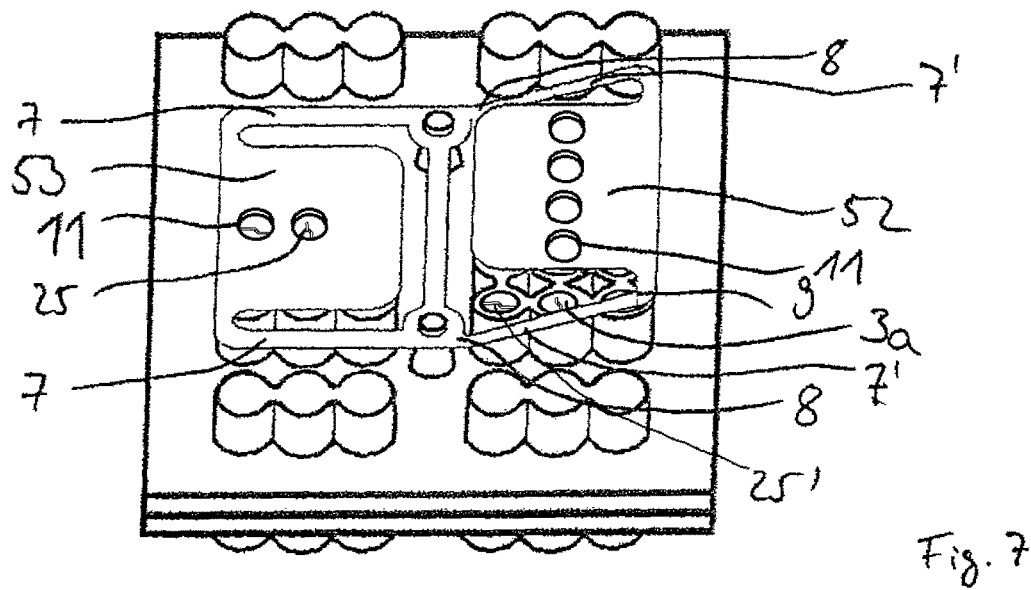

FIG. 7 shows the resilient tongue 52 in an opened state, while the resilient tongue 53 is in a closed state. This results in bending areas 8 and 9 as in the previous examples. The fastening arms 7', which are connected as one piece with the resilient tongue 52 are smaller than the fastening arms 7, which are connected as one piece with the resilient tongue 53. Given the smaller fastening arms 7', a smaller gas pressure is required in order to open the resilient tongue 52.

Figure 8:
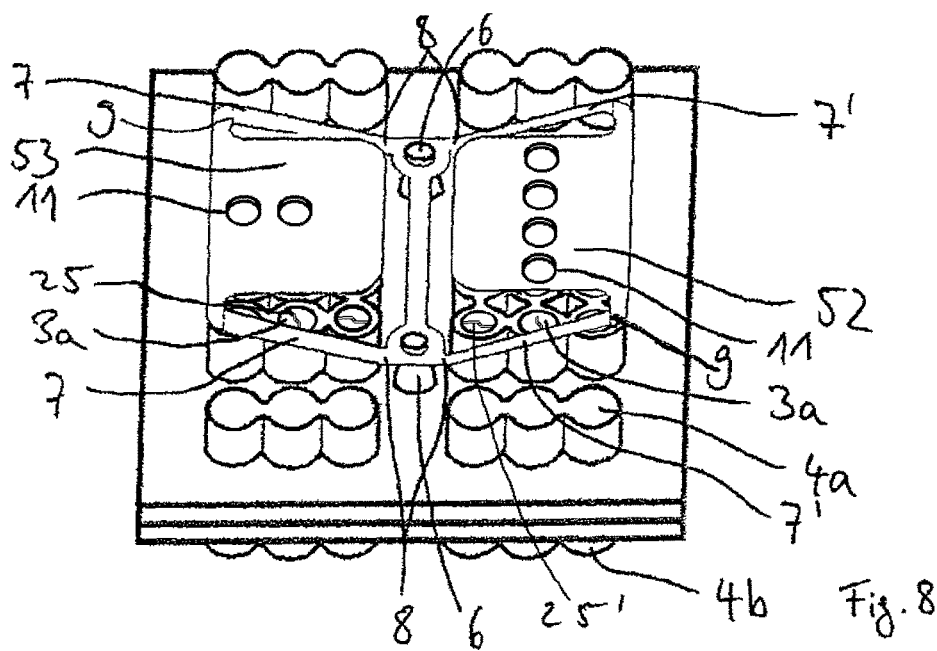

In FIG. 8, both the resilient tongue 53 and the resilient tongue 52 are opened. The gas pressure here now is that large that both resilient tongues are opened in order to balance the pressure difference between both sides of the valve. As in the preceding examples, the resilient tongues 52 and 53 are pressed away parallel from the base plate 2a by the gas flow, so that each two bending areas 8 and 9 result in the area of the mounting means 6 and in the areas of the one-piece transitions between the resilient tongues 52, 53 and the fastening arms 7, 7'.

Figure 9:
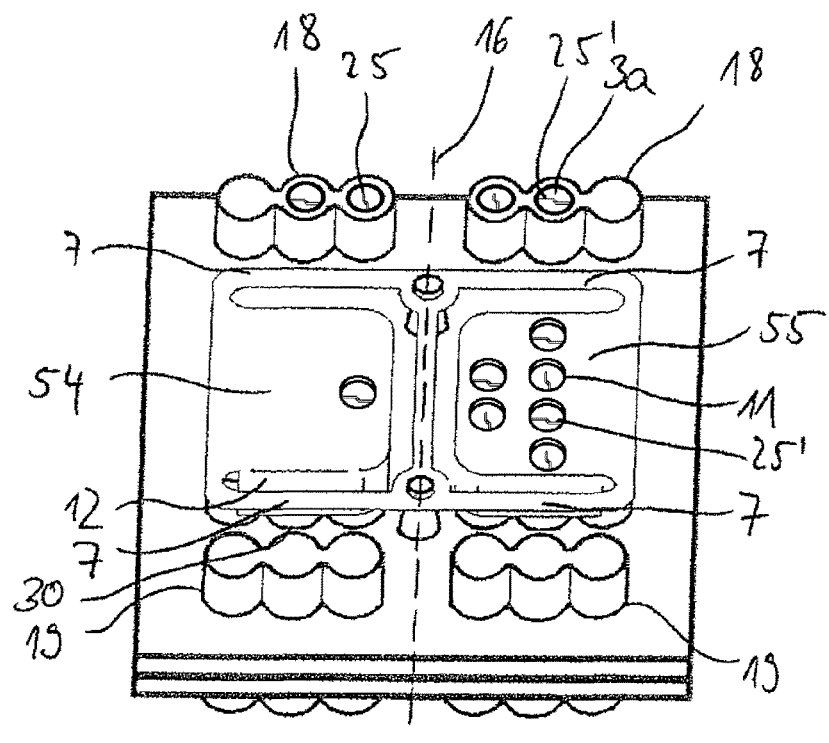
FIG. 9 a fourth embodiment of a valve of a device according to the invention in a perspective top-view.

FIG. 9 shows a fourth embodiment of a valve of a device according to the invention in a perspective view. The valve in the group 18 of each half of the base plate 2a comprises two gas passage openings 3a arranged adjacent to the central axis and designed as bypass openings as well as a closed channel 4a situated remote from the central axis 16, which are not covered by a resilient tongue. In addition, the valve in one half of the base plate 2a comprises a resilient tongue 54, at the edges of which a collar 12 is given which points towards the base plate 2a and which collar at three sides of the group 30 with gas passage openings 3a surrounds these gas passage openings 3a. The collar surrounds the gas passage openings 3a on the side of the group 30 facing the central axis 16 as well as at the sides of the group which are oriented orthogonal to the central axis 16. The collar causes that the passing gas even with lifted resilient tongue 54 is deflected several times and that therefore, oil droplets are separated from the gas. The resilient tongue 54 opposite to the resilient tongue 55 on the second half of the base plate 2a comprises six passage openings 11, where two passage openings are arranged centered in an area of the resilient tongue 55 pointing towards the central axis, where the passage openings 11 are arranged one next to each other parallel to the central axis 16. In addition, four passage openings 11 are located next to each other approximately centered in the resilient tongue 55 parallel to the central axis 16. In all of the embodiments, the passage openings 11 are oriented flush to the preceding gas passage openings 3a.

Figure 10:
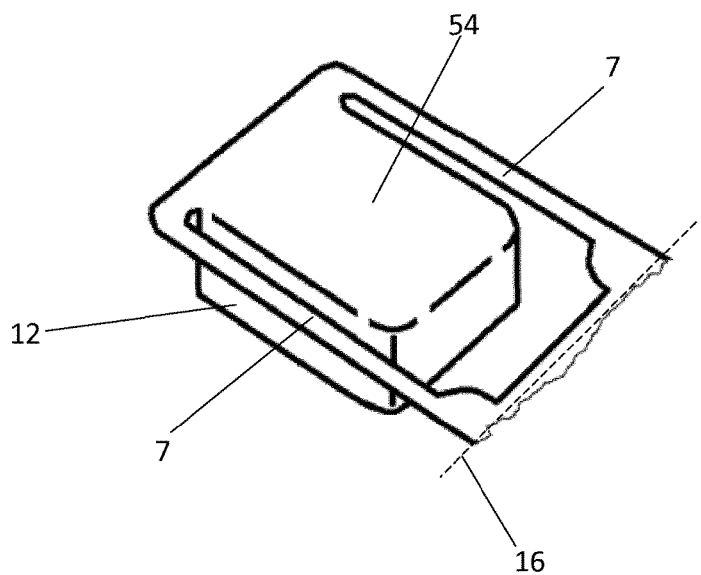
FIG. 10 a detailed view of a resilient tongue according to the fourth embodiment given in FIG. 9.

FIG. 10 shows a detailed view of the resilient tongue 54, where a collar 12 facing the base plate 2a surrounds the edges of the resilient tongue 54 facing the fastening arms 7 as well as the central axis 16. The collar is formed as one piece with the resilient tongue 54.

Figure 11:
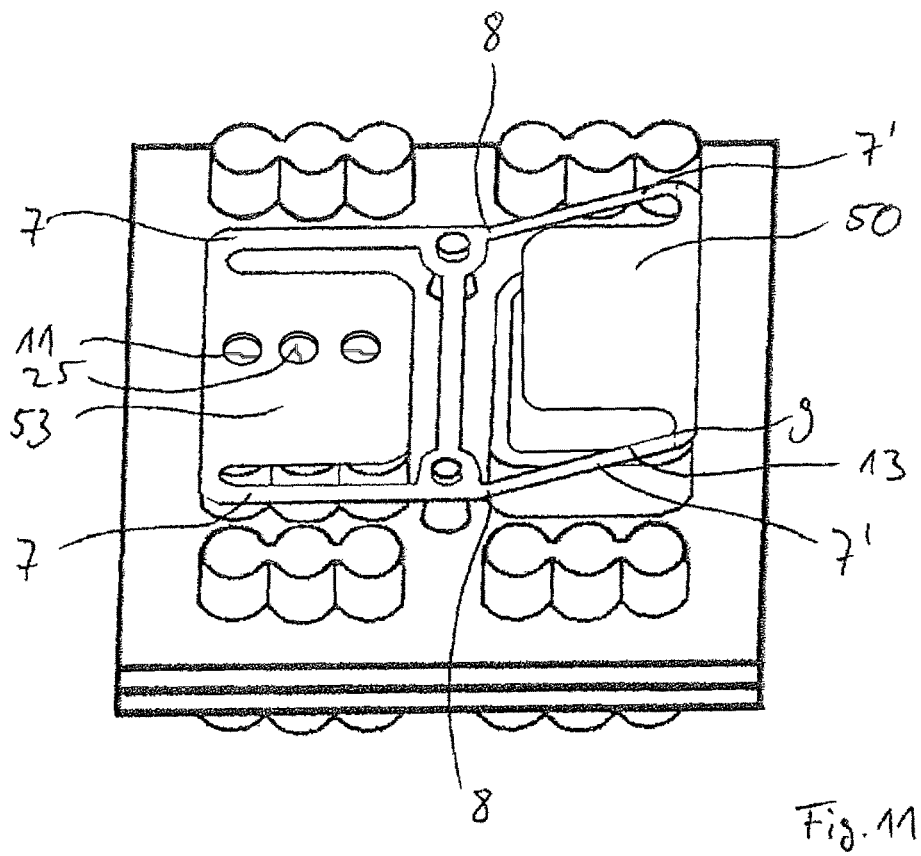
FIG. 11 a fifth embodiment of a valve of a device according to the invention in a perspective top-view.

FIG. 11 shows a fifth embodiment of a valve of a device according to the invention in a perspective view. FIG. 11 shows more or less a valve as in FIGS. 7 to 9 with a resilient tongue 53 with passage openings 11. Other than the valve in FIGS. 7 to 9, this valve opposite to the resilient tongue 53 comprises a resilient tongue 50 as in FIGS. 1 and 2, where the fastening arms 7', which are connected as one piece with the resilient tongue 50 are designed smaller than the fastening arms 7, which are connected as one piece with the resilient tongue 53. Further, the resilient tongue 50 in FIG. 11 does not cover a group 30 of gas passage openings 3a as in FIGS. 1 and 2, but a box-shaped opening 13 with a cross sectional area, which approximately corresponds to the area of the resilient tongue 50, so that the box-shaped opening 13 can be completely closed by the resilient tongue 50. In FIG. 11, the resilient tongue 50 is shown open. The box-shaped opening 13 shows no first guiding geometry 25', but essentially functions as bypass.

Figure 12:
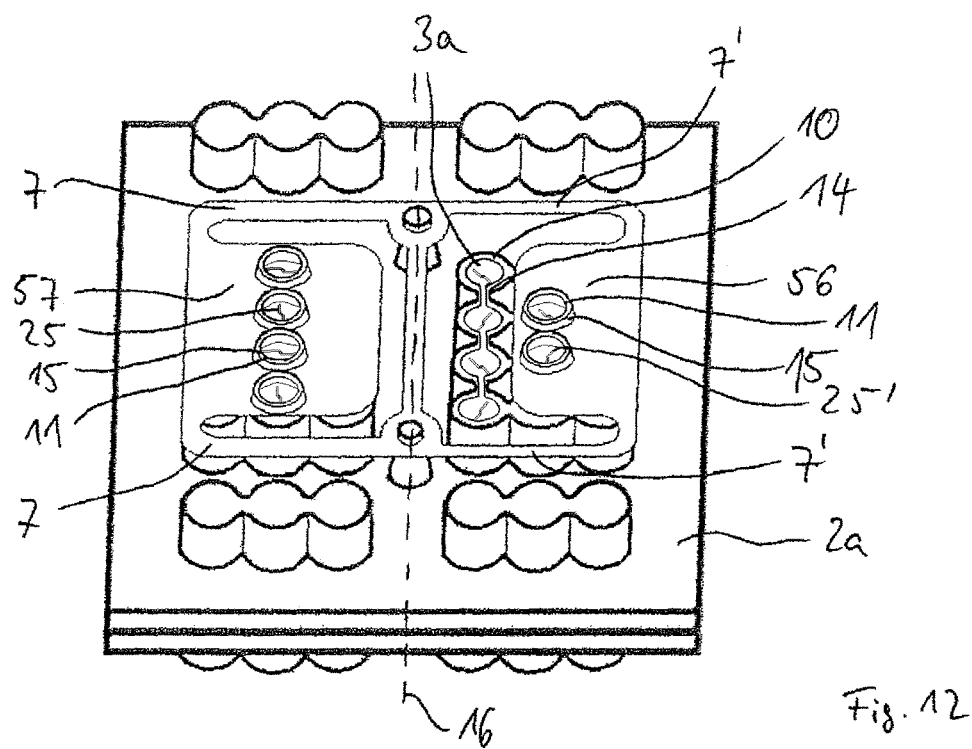
FIG. 12 a sixth embodiment of a valve of a device according to the invention in a perspective top-view.

FIG. 12 shows a sixth embodiment of a valve of a device according to the invention in a perspective view. The resilient tongue 57 comprises four passage openings 11, which are located approximately centered in the resilient tongue, with the passage openings 11 being arranged one next to the other in a direction parallel to the central axis 16. The resilient tongue 56 opposite to the resilient tongue 57 compared to the resilient tongue 57 is designed smaller, so that a row of gas passage openings 3a of the group 30, which are arranged one next to the other and in a direction parallel to the central axis, are not covered by the resilient tongue 56. Adjacent to the row of gas passage openings 3a of the group 30 not covered by the resilient tongue 56, the resilient tongue comprises two passage openings 11, which are each arranged approximately centered relative to the central axis 16, which are arranged one next to the other in a direction parallel to the central axis 16. Around the passage openings 11 of the resilient tongues 56 and 57, protrusions 15 surrounding the passage openings 11 protrude from the plane of the resilient tongues 56 and 57 on one side of the resilient tongues pointing away from the base plate 2a. These protrusions 15 serve for a concentration of the gas flow leaving the passage openings 11 and cause a nozzle effect, which increases the velocity of the gas flow and this way improves the air-oil separation. Further, the gas passage openings 3a situated below the area of the resilient tongues 56 and 57 on the base plate 2a and which all have guiding geometry 25' are provided with slits 14 in their walls 10, so that gas passage openings 3a situated parallel to the central axis 16 and adjacent to each other are connected to each other. Doing so, the gas flows of adjacent gas passage openings 3a are guided one against the other, so that the oil droplets carried along in these gas flows impact one on the other and conglomerate to larger oil droplets, which can precipitate easier. The fastening arms 7', which are connected as one piece with the resilient tongue 56, have been designed small compared to the fastening arms 7, which are connected as one piece with the resilient tongue 57.

Figure 13:
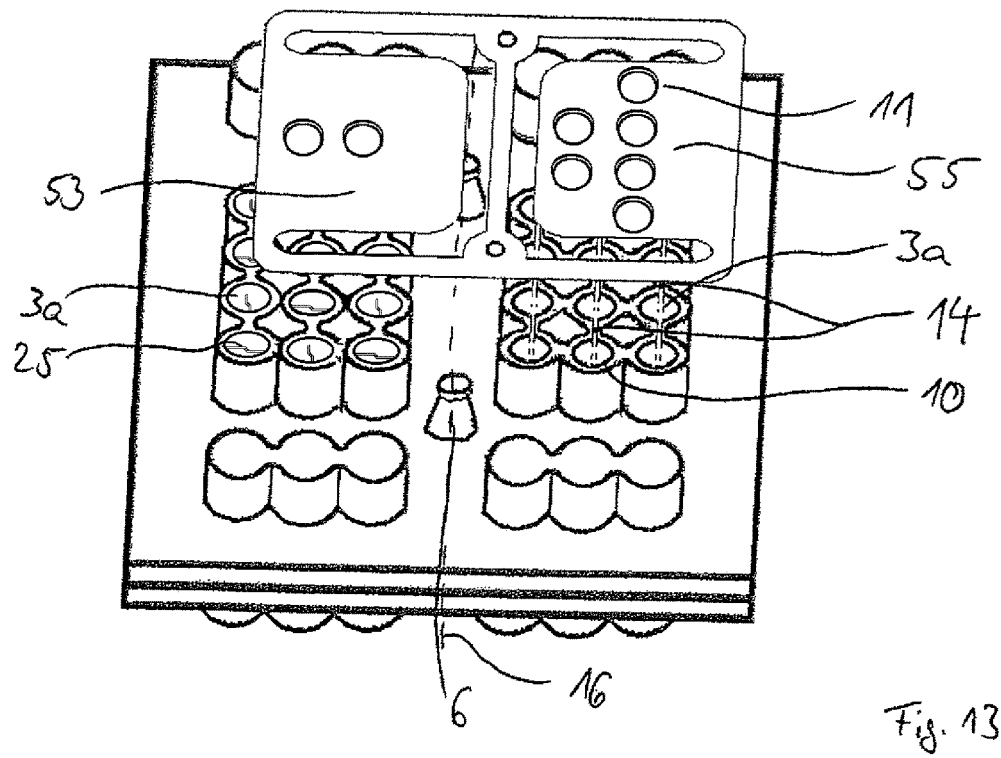
FIG. 13 a seventh embodiment of a valve of a device according to the invention in a perspective top-view.

FIG. 13 shows a seventh embodiment of a valve of a device according to the invention in an exploded view, where the resilient tongues 53 and 56 are designed as in FIGS. 6 to 8 or in FIG. 9, respectively. The gas passage openings 3a, which are covered by the resilient tongue 55, with their gas passage openings 3a parallel to the central axis 16, namely of the half of the groups 30 shown on the right-hand side here, are connected to the walls 10 via slits 14. The gas passage openings 3a and 3b of the groups 30 in one half of the base plates 2a and 2b relative to the central axis 16 show no guiding geometry for the redirection of the gas flow.

Figure 14:
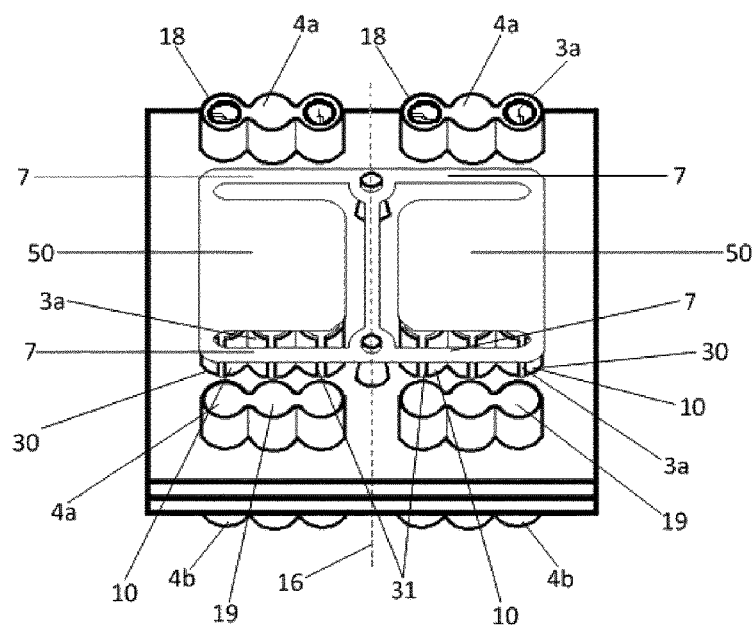
FIG. 14 an eighth embodiment of a valve of a device according to the invention in a perspective top-view.

FIG. 14 shows an eighth embodiment of a valve of an assembly according to the invention in a perspective top-view. The valve in FIG. 14 is constructed similar to the one in FIG. 1. Comparable to FIG. 1, the group 19 only comprise closed channels 4a and no gas passage openings 3a, while group 18 comprises four gas passage openings 3a that cannot be closed by a resilient tongue. The walls 10 of the gas passage openings 3a of groups 30 adjacent to groups 18 and 19 comprise outward slits 31 on their sides pointing towards the groups 18 and 19, which extend parallel to the longitudinal axis of the gas passage openings. The outward slits 31 thus form a connection between the respective gas passage openings 3a and an area outside of the valve body. The outward slits thus form additional outlets for the gas flow, via which the gas flow can exceed even with closed resilient tongues 50. In this respect, an air-oil separation from the gas flow can take place at the walls 10 or on the surfaces of the resilient tongue 50 pointing towards the gas passage openings 3a, if the gas flow guided through the valve impacts on the respective surface; in the same way, an air-oil separation is possible by a redirection and acceleration in the outward slit 31.

The resilient tongues 50 to 57 in the various embodiments show a ratio between the length of the resilient tongue and the width of the resilient tongue (length/width) in the area of 50/200 to 200/50, preferably of 75/150 to 150/75. In this context, the width of the resilient tongue is defined as the extension of the resilient tongue parallel to the central axis 16 and the length of the resilient tongue as the extension of the resilient tongue orthogonal to the central axis 16.

Figure 15:
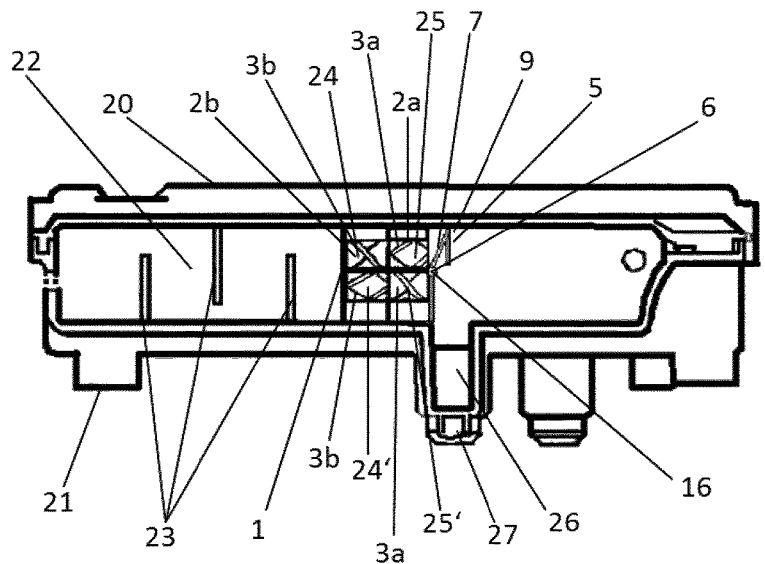
FIG. 15 an embodiment of a device according to the invention in a lateral view.

FIG. 15 shows a cylinder head cover 20, into which an assembly for the separation of oil droplets and/or oil mist from blow-by gases of a combustion engine according to the invention is integrated, in a lateral view. The cylinder head cover 20 comprises an inlet 21 for blow-by gases, a flow channel 22 with impaction walls 23, a valve according to the invention with a valve body 1, basic plates 2a, 2b with gas passage openings 3a, 3b and resilient tongues 5, a collecting pan 26 as well as an oil outlet 27. All gas passage openings of one half of a base plate here are arranged parallel to the central axis 16 and next to each other, respectively. Within the gas passage openings 3a, first guiding geometries 24, 24' and within the gas passage openings 3b second guiding geometries 25, 25' are formed. The guiding geometries 24 and 25' are designed in such a way that the blow-by gas guided through the gas passage openings 3a, 3b is redirected in the shape of half a pitch of a right-hand or left-hand screw, while the guiding geometries 24' and 25 are designed in such a way that the blow-by gas passing through the gas passage openings 3a, 3b is redirected in the opposite direction, thus in the shape of half a pitch of a left-hand or right-hand screw. Here, the guiding geometries 24, 24', 25, 25' arranged in gas passage openings 3a, 3b which are arranged next to each other in one plane or subsequent to each other relative to the flow direction are designed in such a way that they show opposite rotational direction. As a consequence, the gas stream in the first guiding geometry 24 or 24' is redirected in a first direction and the second guiding geometry 25 or 25' causes a reversal of the rotation of the gas flow.

For the air-oil separation, blow-by gases are fed into the cylinder head cover 20 through the inlet 21. The gas-oil-mixture (blow-by gas) first flows through the flow pipe 22, where a part of the oil is already separated at the impaction walls 23, which protrude orthogonal into the flow channel 22. Subsequent to the flow pipe 22, the gas-oil mixture enters into the gas passage openings 3b of the base plate 2b. The first guiding geometry 24 in one half of the base plate 2b relative to the central axis 16 (here not shown) redirects the gas-oil mixture in the shape of half a screw, e.g. a left-handed screw, where again a part of the oil is separated at the walls of the guiding geometry 24. Then, the gas-oil mixture enters into the gas passage openings 3a of the base plate 2a with a second guiding geometry, where the sense of rotation of the gas-oil mixture is inverted in an opposite half screw, in this case thus a right-handed screw. Again, a part of the oil is here separated at the walls of the guiding geometry 25. After having passed the guiding geometry 25, the gas-oil mixture hits the resilient tongue 5, where again a part of the oil is separated by the impaction at the resilient tongue 5 or due to dynamic effects in the slit released by the resilient tongue, with the oil being collected together with the oil collected prior to this in a collecting pan 26. The separated oil is then fed to the oil circuit of the engine through the oil outlet 27. The resilient tongue 5 arranged in the cylinder head cover 20 can here be designed as in one of the embodiments described beforehand.

Figure 16:
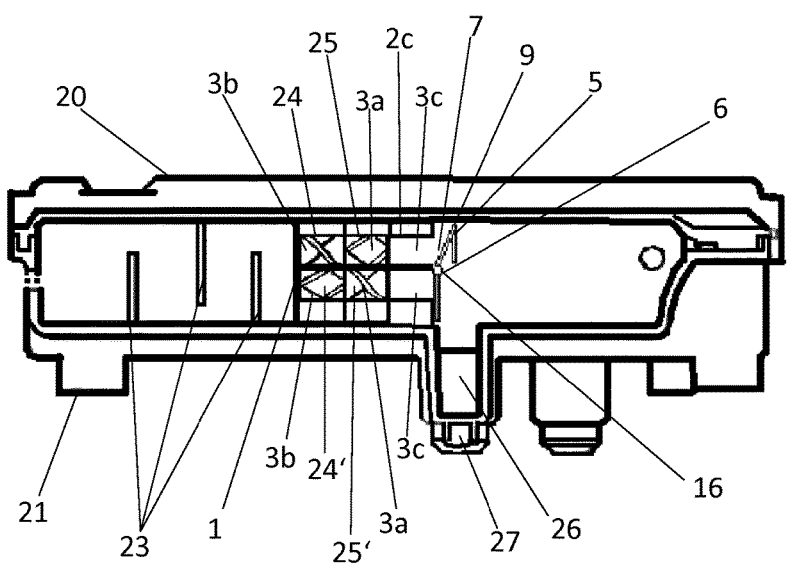
FIG. 16 a further embodiment of a device according to the invention in a lateral view.

FIG. 16 shows a further embodiment of a cylinder head cover 20 with an assembly according to the invention for the separation of oil droplets and/or oil mist from blow-by gases of a combustion engine in a lateral view. In contrast to FIG. 15, the valve body 1 in FIG. 16 additionally comprises a base plate 2c subsequent to the base plate 2a with gas passage openings 3c, which are covered by the resilient tongue 5. Thus, the valve body 1 in total comprises three base plates 2b, 2a, 2c. The gas passage openings 3c other than the gas passage openings 3a, 3b do not comprise any guiding geometries for the redirection of the gas flow. In FIG. 16, as in FIG. 15, all gas passage openings of one half of a base plate are arranged parallel to the central axis 16. The resilient tongue 5 can be designed in such a way that it is adapted to the arrangement of the gas passage openings according to one of the preceding embodiments of a valve according to the invention.

Figure 17:
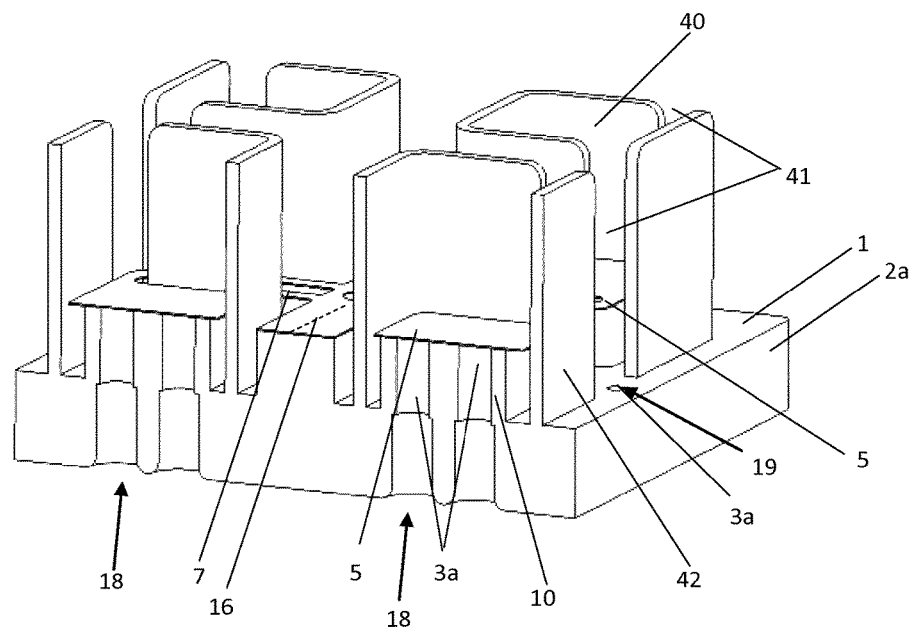
FIG. 17 a ninth embodiment of a valve of a device according to the invention in a perspective top-view.

FIG. 17 illustrates a ninth embodiment of the device according to the invention in the state where the resilient tongues 5 are all closed. Here, only one base plate 2a of the valve body 1 is shown in a perspective view which cuts through the base plate 2a as well as through two of the resilient tongues 5 and the additional geometry on the upper surface of the base plate 2a which is one of the characteristics of this embodiment. This additional geometry, which is one-piece with the base plate 2a consists in a three-sided collar 40 and a lateral wall 41 which are distanced by two slits 41. This additional geometry is arranged four times in the section depicted, namely surrounding each of the resilient tongues 5. Each of them also surrounds the walls 10 of a group 18 of gas passage openings 3a. The lateral wall 42 together with the three-sided collar 40 provides an impaction surface comparable to the collar 12 in the embodiment given in FIG. 10 and this way enhances the air-oil separation. The base plate 2a and the resilient tongues 5 are designed comparable to the resilient tongues 5 in the embodiment given in FIGS. 1 and 2, but no guiding geometries are given in the gas passage openings 3a cut. Further, here, a total of four groups with four resilient tongues are shown and further resilient tongues may be situated in the section opposite to the cutting line. Here, the gas passage opening 3a that cannot be closed by the resilient tongues is located distanced to the other gas passage openings 3 which can be closed by the resilient tongues 5. It here forms an extra group 19 with only one gas passage opening 3. Other than the other gas passage openings, this gas passage opening shows no protrusion of the encircling wall over the surface of the base plate 2a.

Figure 18:
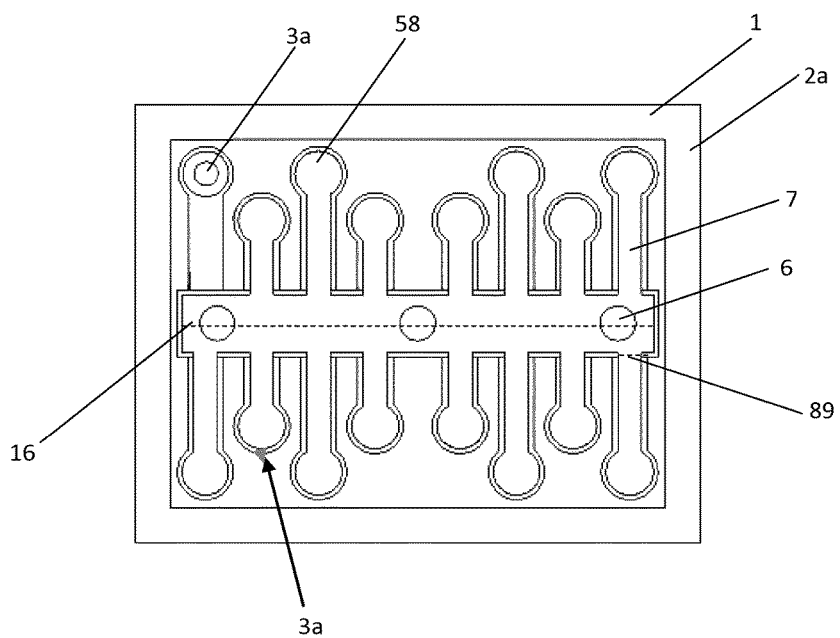
FIG. 18 a tenth embodiment of a valve of a device according to the invention in a top-view.

In FIG. 18, a tenth embodiment of the invention is depicted in a simplified top-view. Here, a total of seven resilient tongues 58 is given. They are different from the resilient tongues in the other embodiments in that they comprise only one bending line 89 and only one fastening arm 7 per resilient tongue. As a consequence, the part of the resilient tongue 5 closing a gas passage opening 3a is situated at the outermost free end of the fastening arm 7 with the fastening arm 7 extending orthogonal to the central axis 16. The gas passage opening 3a closes to the upper left corner is not closed by a resilient tongue and this way remains open in all operational states.

The invention claimed is:

1. A device for the separation of oil droplets and/or oil mist from blow-by gases of a combustion engine with a valve for the control of a gas flow from a pressure side to a suction side of the air-oil separator, where the valve comprises a valve body with at least two or more gas passage openings from the pressure side to the suction side of the valve as well as at least one valve closure for the suction-sided closure of gas passage openings of the valve body, wherein the at least one valve closure comprises resilient two tongues, wherein said tongues are realized in such a way that at least one of the gas passage openings cannot be closed by the resilient tongues, wherein said two tongues either face one another across a longitudinal axis located between two of said gas passage openings of said valve body or extend away from one another from said axis.

2. The device according to claim 1, wherein said resilient tongues relative to the flow direction of the gas flow axial-concentrically, or axial-eccentrically behind at least one of the gas passage openings, comprises at least one passage opening.

3. The device according to claim 2, wherein the diameter of the at least one of the passage openings is smaller than a diameter of the suction-sided outlet of the gas passage opening arranged axially ahead of the passage opening.

4. The device according to claim 3, wherein at least one of the resilient tongues do not extend over at least one of the gas passage openings.

5. The device according to claim 1, wherein more than two resilient tongues are provided.

6. The device according to claim 5, wherein said resilient tongues have a common mounting area for the mounting of the resilient tongues at the valve body.

7. The device according to claim 6, wherein at least one of the resilient tongues is mounted to the valve body via at least one fastening arm in such a resilient manner that it is moveable between a first position, in which it closes the gas passage openings covered and a second position in which it releases the gas passage openings covered.

8. The device according to claim 7, wherein at least one of the fastening arms is mounted in such a way that at least one of the resilient tongues mounted via the fasting arm is moveable in such a manner that it moves away from and/or closes the at least two gas passage openings in a successive manner.

9. The device according to claim 7, wherein at least one of the fastening arms is mounted in such a way that at least one of the resilient tongues moves away from and/or moves towards the at least two gas passage openings in a tilting movement.

10. The device according to claim 1, wherein at least one of the resilient tongues is pre-tensioned in such a way that it closes the covered gas passage openings when the pressure difference between a side of the resilient tongue pointing towards the gas passage openings and a side of the resilient tongue pointing away from the gas passage openings is below a predefined threshold value.

11. The device according to claim 1, wherein the valve body comprises at least two groups of gas passage openings, which each comprise at least two gas passage openings, and wherein the valve closure comprises a number of resilient tongues that corresponds to the number of groups of gas passage openings, where each of the resilient tongues is arranged in such a way that gas passage openings of one group can at least in part be closed by one of the resilient tongues.

12. The device according to claim 11, wherein two fastening arms are provided for each of the resilient tongues, which extend along two opposite edges of the resilient tongues and which enclose one of the resilient tongues between them in the plane of the resilient tongues, where the fastening arms are mounted at one of their ends at the valve body and at their other end are connected to the resilient tongue.

13. The device according to claim 11, wherein the fastening arms relative to the radial direction behind the last gas passage opening which can be closed by one of the resilient tongues are connected with the respective resilient tongue.

14. The device according to claim 11, wherein at least two gas passage openings covered by two different resilient tongues have different cross-sections of their inlets and/or their outlets and/or centrally between their inlets and their outlets.

15. The device according to claim 11, wherein at least two adjacent gas passage openings along their axial extension are connected to each other at least in sections.

16. The device according to claim 11, wherein the gas passage openings in a radial direction are each delimited by a wall and that at least one of the gas passage openings along its axial extension at least in sections comprises a slit in the wall, where the slit does not open up to one of the other gas passage openings.

17. The device according to claim 11, wherein the valve body comprises a base plate in which the gas passage openings are arranged, where the gas passage openings in a radial direction are delimited by a wall and where the wall of at least one of the gas passage openings protrudes beyond the base plate in the direction of at least one of the resilient tongues.

18. The device according to claim 17, wherein at least one of the resilient tongues at least one of its edges comprises a collar which is bent in the direction of the gas passage openings and which surrounds the gas passage openings laterally.

19. The device according to claim 11, wherein in at least one of the resilient tongues on at least one of the passage openings, a protrusion is arranged which surrounds the outer edge of the passage opening, which protrudes from the plane of the respective at least one resilient tongue facing away from the gas passage openings.

20. The device according to claim 11, wherein in at least one of the resilient tongues at least one of the passage openings a protrusion is arranged which surrounds the outer edge of the passage opening in sections, which protrudes from the plane of the respective at least one resilient tongue facing away from the gas passage openings, where the protrusion surrounding sectionally on its side pointing away from the respective at least one resilient tongue protrudes into a streaming area, which corresponds to an axial prolongation of at least one of the gas passage openings.

21. The device according to claim 11, wherein in at least one of the gas passage openings a guiding geometry is arranged, which provides the gases passing with a rotation about the axial direction of the gas passage opening.

22. The device according to claim 1, wherein at least one of the resilient tongues is comprised of spring steel.

23. The device according to claim 1, wherein the valve body is comprised of a thermoplastic.

* * * * *